United States Patent [19]
Singh et al.

[11] Patent Number: 5,635,146
[45] Date of Patent: Jun. 3, 1997

[54] METHOD FOR THE DISSOLUTION AND PURIFICATION OF TANTALUM PENTOXIDE

[75] Inventors: Raj P. Singh, Sayre; Michael J. Miller, Towanda, both of Pa.

[73] Assignee: Osram Sylvania Inc., Danvers, Mass.

[21] Appl. No.: 565,334

[22] Filed: Nov. 30, 1995

[51] Int. Cl.$^6$ .................................................. C01G 35/00
[52] U.S. Cl. ............................... 423/65; 423/67; 423/68; 423/592; 423/593
[58] Field of Search ................................ 423/65, 67, 68, 423/592, 593

[56] References Cited

U.S. PATENT DOCUMENTS

| | | | |
|---|---|---|---|
| 3,072,459 | 1/1963 | Foos et al. | 423/67 |
| 3,117,833 | 1/1964 | Pierret | 23/19 |
| 3,481,694 | 12/1969 | Hudswell et al | 423/65 |
| 3,712,939 | 1/1973 | Capps et al. | 423/63 |
| 4,446,115 | 5/1984 | Endo et al. | 423/63 |
| 4,490,340 | 12/1984 | Ritsko et al. | 423/65 |
| 4,495,158 | 1/1985 | Ritsko et al. | 423/65 |
| 4,537,750 | 8/1985 | Ritsko et al. | 423/65 |
| 4,663,130 | 5/1987 | Bergman et al. | 423/68 |
| 4,673,554 | 6/1987 | Niwa et al. | 423/63 |

FOREIGN PATENT DOCUMENTS

| | | | |
|---|---|---|---|
| 0034348 | 8/1981 | European Pat. Off. | C22B 34/24 |
| 0241278 | 10/1987 | European Pat. Off. | C01G 35/00 |
| 2537354A1 | 2/1977 | Germany | C01G 35/00 |

OTHER PUBLICATIONS

Nassau et al, *Quenched Metastable Glassy and Crystalline Phases in the System Lithium–Sodium–Potassium Metatantalate*, J. Amer. Cer. Soc., 62(1–2), 74–79 (1978) (no month available).

Borchers et al., *Extractive Metallurgy of Tantalum*, Extractive Metallurgy of Refractory Metals, The Metallurgical Society of AIME, 110th AIME Annual Meeting, 95–106 (Feb. 22–26, 1981).

*Tantalum*, Elements, 12–17 (1992) (no month available).

*Abstract*, Derwent WPI, JP 043298808 A, (1992) (no month available).

Bielecki, *Use of Ion Exchange Techniques for Production of High–purity Potassium Fluorotantalate*, Advances in Extractive Metallurgy, The Institute of Mining and Metallurgy, London, 777–788 (Apr. 17–20, 1967).

Carlson et al., *Pure Columbium and Tantalum Oxides by Liquid–Liquid Extraction*, Journal of Metals, 472–475 (Jun. 1960).

Droeghkamp et al., *Tantalum and Tantalum Compounds*, Kirk–Othmer Encyclopedia of Chemical Technology, Third Ed., v.22, 541–565, John Wiley & Sons (1983) no month available.

Baram, *Kinetics of Dissolution of Niobium and Tantalum Pentoxides in Hydrofluoric Acid*, Journal of Applied Chemistry of the USSR, 38, 2181–2188 (1965) (no month available).

Zelikman et al., *Chapter III: Tantalum and Niobium*, Metallurgy of Rare Metals, U.S. Dept. of Commerce, 99–154 (1966) (no month available).

*Primary Examiner*—Wayne Langel
*Attorney, Agent, or Firm*—Robert F. Clark

[57] ABSTRACT

A method is disclosed for the dissolution and purification of tantalum pentoxide. The impure tantalum pentoxide is reacted with a potassium-containing compound to form potassium tantalate. The potassium tantalate is optionally slurried with sulfuric acid and dissolved in an HF medium. The solution is suitable for purification by conventional ion exchange or solvent extraction methods. A potassium fluorotantalate precipitate may also be formed by adding KCl to the solution. The fluorotantalate precipitate may be further processed into a pure tantalum pentoxide by suspending the precipitate in an aqueous solution optionally containing a chelating agent and adding ammonium hydroxide to form ammonium tantalum oxide which can then be converted to tantalum pentoxide by calcining at high temperature.

16 Claims, 1 Drawing Sheet

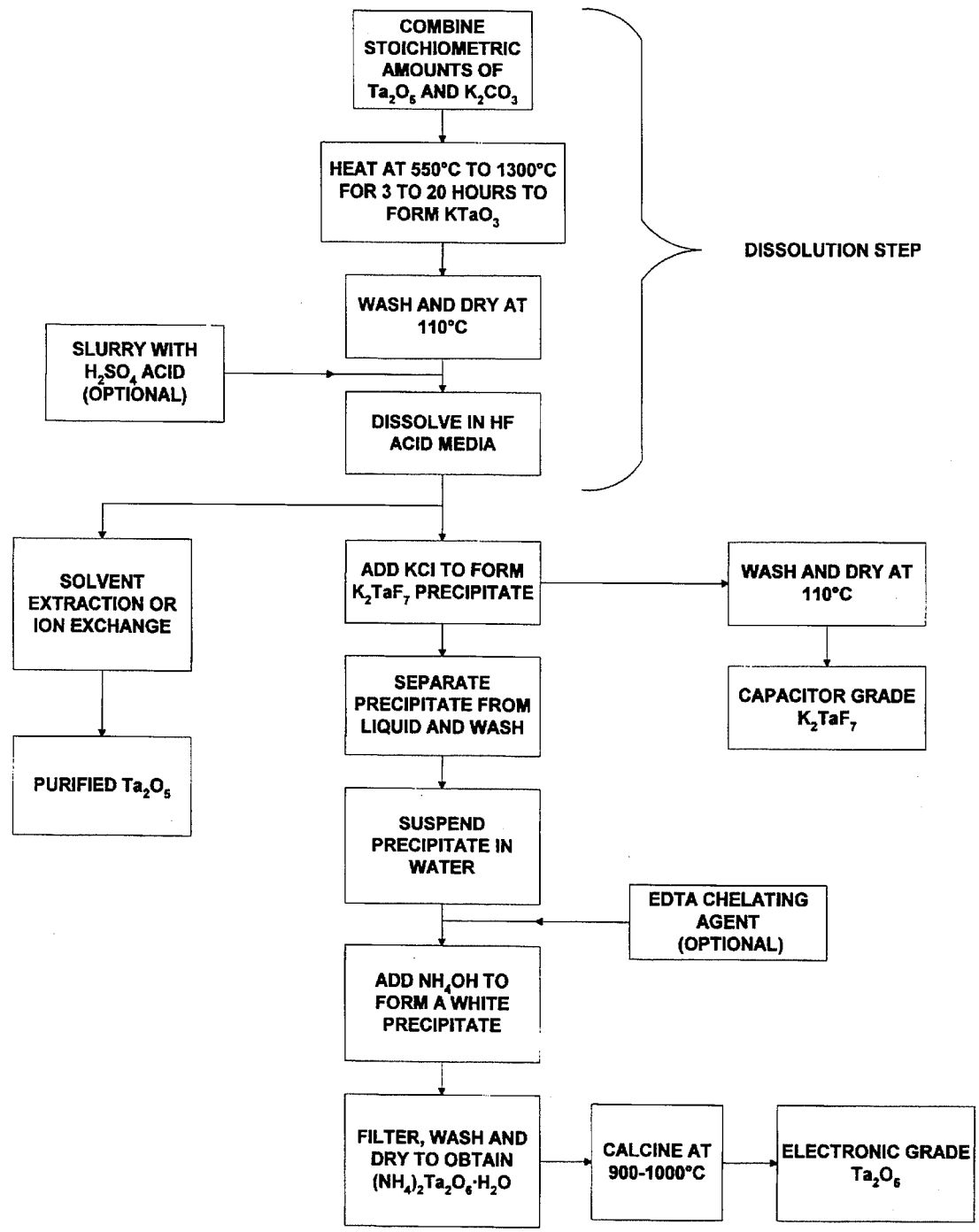

METHOD FOR THE DISSOLUTION AND PURIFICATION OF TANTALUM PENTOXIDE

TECHNICAL FIELD

This invention relates to methods for the processing and purification of tantalum-containing ores and compounds. In particular, this invention relates to methods of producing high purity tantalum compounds from standard technical grade tantalum pentoxide.

BACKGROUND ART

High purity tantalum metal and tantalum pentoxide have become increasingly important to the electronics industry in the preparation of advanced electronic materials used in the manufacture of devices such as surface acoustic wave filters, pyroelectric infrared sensors and optoelectronic devices. High purity tantalum pentoxide is also required for the preparation of tantalate x-ray phosphors for x-ray intensifier screens. The purity of tantalum metal and tantalum pentoxide used in the manufacture of such products should be greater than 99.99% and preferably approach 99.9999%.

Three major methods exist for purifying tantalum-containing materials: distillation (or chlorination), liquid-liquid solvent extraction and ion exchange.

In the distillation method, a mixture of an impure tantalum-containing material and carbon is reacted with chlorine gas at about 600° to 800° C. Although distillation is a well established commercial process for the purification of tantalum-containing materials, it has difficulty separating tantalum and niobium because of the small difference in the boiling points of tantalum chloride (239° C.) and niobium chloride (249° C.). Since niobium is a ubiquitous impurity in tantalum-containing materials, solvent extraction and ion exchange methods are preferred over distillation when high purity tantalum and tantalum pentoxide are desired.

In solvent extraction methods, an impure tantalum-containing material is dissolved in hydrofluoric acid (HF) media and brought into contact with an organic solvent. Tantalum values are selectively extracted into the organic phase, back-extracted into aqueous solution, and precipitated as tantalum hydroxide by hydrolyzing with aqueous ammonia. The precipitated hydroxide can be converted to tantalum pentoxide by calcining in air. However, multiple extraction/back-extraction cycles may be necessary to produce the desired high purity. Examples of liquid-liquid solvent extraction methods are disclosed in U.S. Pat. Nos. 3,117,833, 3,712,939 and 4,673,554.

In ion exchange methods, an impure tantalum-containing material is dissolved in HF media and then passed through an anion exchange column which selectively retains tantalum metal values. The impurities remain in solution and are discharged in the effluent. The retained tantalum values are subsequently eluted from the column and then precipitated as tantalum hydroxide as above. An example of such a method is disclosed in U.S. Pat. No. 4,446,115. However, because of the fairly small exchange capacity of the anion exchange resin, this method is expensive to apply on a commercial scale.

While the prior art focuses the purification of tantalum-containing ore and scrap, there exists a large inventory of technical grade tantalum pentoxide which could provide a relatively inexpensive raw material for the production of high purity tantalum and tantalum oxide. However, standard technical grade tantalum pentoxide contains a number of different impurities (e.g., Al, Si, F, Cl, Na, Cr, Fe, Co, Ni, Cu, Ti, Zr, Mo, Nb, and W) at levels between 500 to 10,000 parts per million (ppm). Such high impurity levels would be unacceptable for use in the above electronic and phosphor applications. Thus, it is necessary to purify technical grade tantalum pentoxide before it can be used.

Unfortunately, tantalum pentoxide is extremely difficult to dissolve even in hydrofluoric acid, especially the crystalline $\beta$-$Ta_2O_5$ phase. Direct dissolution in HF requires excessively long dissolution times and many times the amount of HF dictated by the stoichiometry of the reaction. Thus, direct dissolution of $Ta_2O_5$ for use in conventional purification methods like solvent extraction and ion exchange is commercially impractical.

The chemical reaction for the dissolution of $Ta_2O_5$ in HF can be written as:

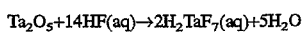

$$Ta_2O_5 + 14HF(aq) \rightarrow 2H_2TaF_7(aq) + 5H_2O$$

The reaction kinetics of the dissolution of $Ta_2O_5$ in HF media have been investigated by I. I. Baram, *Journal of Applied Chemistry of the U.S.S.R.*, V. 38, 2181–88 (1965). According to the reported results, only about 5.3 g of pure $Ta_2O_5$ (which had been calcined at 800° C. for 3 hours) could be dissolved in 1 l of 14.6M HF in 4 hours at 70° C. Because the dissolution reaction was reported to be first order with respect to HF concentration, it can be estimated that approximately 10.8 g of $Ta_2O_5$ would have dissolved in 1 l of 29 M HF in 4 hours at 70° C., a molar ratio of approximately 1200:1 HF/$Ta_2O_5$. Thus, it is evident that under the above conditions, much more HF is required to dissolve $Ta_2O_5$ than would be dictated by stoichiometry. Such a large excess of HF is not only economically undesirable but is also likely to be hazardous.

Although increasing the temperature will increase the rate of dissolution, the amount of HF required for dissolution is still many times the stoichiomteric amount. For example, over a period of 3 days at 100° C., approximately 15 g of $Ta_2O_5$ can be dissolved in 190 ml of approximately 25M HF, a molar ratio of about 140:1 HF/$Ta_2O_5$, or about 10 times the stoichiometric amount. However, using higher dissolution temperatures also increases energy consumption and the amount of dangerous HF fumes.

Therefore, it would be a significant improvement in the art to have a method of dissolving $Ta_2O_5$ in an HF media to produce a tantalum-containing solution which could be used directly in conventional solvent extraction and ion exchange purification methods. It would also be a significant improvement to have a method of dissolving $Ta_2O_5$ in HF media which would require much less HF than needed for direct dissolution of $Ta_2O_5$ in HF media under the same conditions.

SUMMARY OF THE INVENTION

It is an object of the invention to obviate the disadvantages of the prior art.

It is another object of the invention to provide an economical and safe method for the dissolution and purification of tantalum pentoxide.

It is a further object of the invention to provide a method for the dissolution and purification of tantalum pentoxide without utilizing solvent extraction or ion exchange techniques.

In accordance with one aspect the invention, a method is provided for the dissolution and purification of tantalum pentoxide comprising reacting tantalum pentoxide and a potassium-containing compound to form potassium tantalate, dissolving the potassium tantalate in a hydrofluoric acid medium to form a solution containing tantalum values and impurities and separating the tantalum values from the impurities.

In accordance with another aspect of the invention, a method is provided for the dissolution and purification of tantalum pentoxide comprising reacting stoichiometric amounts of an impure tantalum pentoxide and potassium carbonate to form potassium tantalate, optionally slurrying the potassium tantalate with sulfuric acid, dissolving the potassium tantalate in an hydrofluoric acid medium to form a solution containing tantalum values and impurities, precipitating potassium fluorotantalate by adding a water soluble potassium compound, filtering the solution to obtain a wet precipitate, suspending the wet precipitate in water, optionally adding an effective amount of a chelating agent, precipitating $(NH_4)_2Ta_2O_6 \cdot H_2O$ by adding ammonium hydroxide and calcining the $(NH_4)_2Ta_2O_6 \cdot H_2O$ to obtain a tantalum pentoxide having low amounts of niobium and transition metals.

BRIEF DESCRIPTION OF THE DRAWINGS

The FIGURE is a block diagram illustrating a method of the invention.

DESCRIPTION OF THE PREFERRED EMBODIMENTS

For a better understanding of the present invention, together with other and further objects, advantages and capabilities thereof, reference is made to the following disclosure and appended claims taken in conjunction with the above-described drawings. Examples are provided for illustration purposes and should not be construed as limiting the invention to a particular embodiment.

In order to purify technical grade tantalum pentoxide using conventional solvent extraction or ion exchange techniques, it is necessary to first dissolve the impure $Ta_2O_5$ in an HF media. To avoid the difficulties encountered with dissolving $Ta_2O_5$ directly in an HF media, the impure $Ta_2O_5$ is first converted to potassium tantalate, $KTaO_3$, by reacting the $Ta_2O_5$ with a stoichiometric amount of a potassium-containing compound, preferably, potassium carbonate, $K_2CO_3$, at a temperature between about 550° C. to about 1300° C. for a time between about 3 to about 20 hours. Other sources of potassium may also be used, e.g., KCl, $K_2O$, $K_2C_2O_4$, $KHCO_3$, etc. The preferred reaction proceeds according to the following equation:

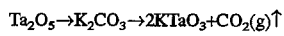

$$Ta_2O_5 + K_2CO_3 \rightarrow 2KTaO_3 + CO_2(g)\uparrow$$

The preferred temperature and time for this reaction are about 750° C. to about 850° C. for about 5 hours to about 10 hours The conversion of standard technical grade $Ta_2O_5$ to $KTaO_3$ yields a very efficient method of dissolving tantalum pentoxide in HF media, since $KTaO_3$ almost instantaneously dissolves in HF media. Moreover, during the preparation of $KTaO_3$, the purity of technical grade $Ta_2O_5$ is improved with respect to W, Mo, Cr and Nb. This increase in purity is exemplified in Table 2. Additionally, the perovskite form of $KTaO_3$ may be made exclusively at 700° C. from stoichiometric amounts of $K_2CO_3$ and $Ta_2O_5$ without forming any of the metabolic form of $KTaO_3$ having the pyrochlore cubic structure.

TABLE 2

| Elements | Impurity Concentration With Respect to Ta, ppm (unless otherwise indicated) | |
|---|---|---|
| | $Ta_2O_5$ | $KTaO_3$ |
| Potassium | <2 | 12% |
| Arsenic | <1 | <1 |
| Bismuth | <1 | <1 |
| Chromium | 15 | 6 |
| Cobalt | <1 | <1 |
| Copper | 21 | 2 |
| Iron | 64 | 59 |
| Lead | 2 | <1 |
| Manganese | 2 | 2 |
| Molybdenum | <1 | <1 |
| Nickel | 9 | 7 |
| Niobium | 250 | 218 |
| Thorium | <1 | <1 |
| Tin | 2 | <1 |
| Titanium | <1 | <1 |
| Tungsten | 140 | 108 |
| Vanadium | <1 | <1 |
| Zinc | 4 | 2 |
| Zirconium | <1 | <1 |

After the $KTaO_3$ has been formed, it is cooled, washed with water, and dried at 110° C. The $KTaO_3$ reacts strongly with HF and can be dissolved almost instantaneously at room temperature. However, for a more efficient dissolution process, the $KTaO_3$ is slurried first with sulfuric acid, $H_2SO_4$, before dissolution in HF.

EXAMPLE 1

10 ml of concentrated (49–51%) HF acid were added to 5 g of $KTaO_3$ prepared from technical grade $Ta_2O_5$. An immediate and vigorous exothermic reaction took place and almost all of the solid material was dissolved. The solution was diluted to 200 ml with water and precipitated with 7.4M ammonium hydroxide. The precipitate was analyzed by Glow Discharge Mass Spectrometry (GD-MS) which determined that only 0.3% by weight potassium remained in the precipitate thereby indicating that more than 97% of the $KTaO_3$ dissolved in the HF. Thus, a tantalum pentoxide solution having 16 to 20 g Ta/l can easily be made in approximately 1.5M (or 2% HF).

EXAMPLES 2–3

25 g of $KTaO_3$ prepared from technical grade $Ta_2O_5$ was slurried with 25 ml of concentrated $H_2SO_4$ and then 25 ml of concentrated (29M) HF was added. A colorless paste was obtained as a result of the strong exothermic reaction. The paste completely dissolved in dilute (approx. 1.5M) HF to yield a clear solution containing approximately 17 g/l Ta.

By comparison, under similar conditions, 25 g of technical grade $Ta_2O_5$ was slurried with 25 ml of concentrated $H_2SO_4$ and then 25 ml of concentrated HF was added. No visible reaction was observed between the solid and the acid. The solid was separated from the HF, washed with water, dried and weighed. Only 1.2 g of the initial 25 g of $Ta_2O_5$ was found to have dissolved in the HF media.

Thus, under similar conditions, 20.6 g of technical grade $Ta_2O_5$ (equivalent to 25 g $KTaO_3$) can be easily dissolved in HF media by first converting the $Ta_2O_5$ to $KTaO_3$ whereas only 1.2 g of $Ta_2O_5$ can be dissolved by direct dissolution.

EXAMPLE 4

125 g of $KTaO_3$ made from technical grade $Ta_2O_5$ was dissolved in less than 10 minutes in 5.5 1 of a dilute HF/H$_2$SO$_4$ solution containing 225 ml of concentrated HF and 200 ml of concentrated H$_2$SO$_4$. Thus, it is relatively easy to produce a solution containing 15 g/l Ta using a dilute HF/H$_2$SO$_4$ solution (1% HF and 1.3N H$_2$SO$_4$).

Other alkali tantalates do not exhibit the same advantageous dissolution properties as KTaO$_3$. For example, tests comparing the dissolution properties of KTaO$_3$ with NaTaO$_3$ and LiTaO$_3$ found that under similar conditions only 25% of the NaTaO$_3$ and LiTaO$_3$ would dissolve in an HF medium as compared to almost 100% of the KTaO$_3$.

The reaction for the dissolution of KTaO$_3$ is believed to occur by the following mechanism:

2KTaO$_3$+14HF(aq)→H$_2$TaF$_7$(aq)+2KOH(aq)+4H$_2$O

Some of the potassium ions may react with the aqueous H$_2$TaF$_7$ in the tantalum-containing solution to form a potassium fluorotantalate, K$_2$TaF$_7$, precipitate. However, the precipitated K$_2$TaF$_7$ can easily be dissolved in dilute HF and H$_2$SO$_4$. Thus, the conversion of the technical grade Ta$_2$O$_5$ to KTaO$_3$ followed by dissolution in HF media yields a tantalum-containing solution which is appropriate for use in conventional solvent extraction or ion exchange purification methods.

In addition, highly pure capacitor grade K$_2$TaF$_7$ can be directly precipitated from the tantalum-containing solution by adding a water soluble potassium compound such as KCl. The reaction proceeds as follows:

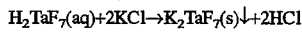

H$_2$TaF$_7$(aq)+2KCl→K$_2$TaF$_7$(s)↓+2HCl

In a preferred method, the amount of the water soluble potassium compound used in the reaction is approximately twice that required by stoichiometry. Other acceptable water soluble potassium compounds which may be used to form the K$_2$TaF$_7$ precipitate include K$_2$CO$_3$, KOH, KF, K$_2$C$_2$O$_4$ and K$_2$O.

EXAMPLE 5

Highly pure potassium fluorotantalate was made by forming a mixture of 132 g of technical grade Ta$_2$O$_5$ with 45 g of K$_2$CO$_3$. The mixture was heated in an alumina crucible at 750° C. for 5–10 hours to form KTaO$_3$. After washing the KTaO$_3$ with water and drying at 100° C., 125 g of the dried KTaO$_3$ was slurried with 125 ml of concentrated H$_2$SO$_4$ in a plastic beaker to which was then added 225 ml of concentrated HF. An exothermic reaction occurred converting all of the KTaO$_3$ to K$_2$TaF$_7$/H$_2$TaF$_7$. Water was added to bring the solution volume to 4 liters. The solution was separated from the K$_2$TaF$_7$ precipitate and 100 g of KCl was added to the solution to complete the precipitation of K$_2$TaF$_7$ which was then separated from the solution. Both precipitates were mixed together and washed with two 1l volumes of 0.5% HF (water washing may also be used). The washed mixture was dried at 100° C. and characterized by x-ray diffraction (XRD) and GD-MS. The XRD results confirmed that the precipitates were K$_2$TaF$_7$. Table 1 contrasts the purity of the precipitated K$_2$TaF$_7$ with that of the technical grade Ta$_2$I$_5$. These results show that the niobium and transition metal impurities present in the technical grade Ta$_2$O$_5$ have been greatly reduced resulting in a highly pure K$_2$TaF$_7$ which is acceptable for use in the manufacture of tantalum capacitors.

It can also been seen from Table 1 that the purity of potassium fluorotantalate prepared via dissolution of KTaO$_3$ (KTaO$_3$/H$_2$SO$_4$/HF) was significantly better than that prepared via direct dissolution of Ta$_2$O$_5$ (Ta$_2$O$_5$/H$_2$SO$_4$/HF). The addition of H$_2$SO$_4$ before the dissolution of KTaO$_3$ in HF promotes the removal of Nb and other transition metal impurities during the selective crystallization of K$_2$TaF$_7$. As can be seen in Table 1, a purer K$_2$TaF$_7$ is obtained by adding H$_2$SO$_4$ to the KTaO$_3$ prior to dissolution in HF (KTaO$_3$/H$_2$SO$_4$/HF) than direct dissolution of the KTaO$_3$ in HF (KTaO$_3$/HF).

TABLE 1

| | Concentration, ppm | | | |
|---|---|---|---|---|
| Elements | Ta$_2$O$_5$ | K$_2$TaF$_7$ by KTaO$_3$/ H$_2$SO$_4$/HF | K$_2$TaF$_7$ by KTaO$_3$/ HF only | K$_2$TaF$_7$ by TaO$_5$/ H$_2$SO$_4$/HF |
| Chromium | 15 | <1 | 1 | 1 |
| Copper | 21 | 2 | 2 | <1 |
| Iron | 64 | 1 | 8 | 5.5 |
| Lead | 2 | <1 | 1 | 1 |
| Manganese | 2 | <1 | <1 | <1 |
| Nickel | 9 | <1 | <1 | 6 |
| Niobium | 250 | 4 | 20 | 13 |
| Tin | 2 | <1 | <1 | 2 |
| Titanium | <1 | <1 | 5 | 2 |
| Tungsten | 140 | 2 | 13 | 43 |
| Zinc | 4 | <1 | 2 | 8 |

Potassium fluorotantalate (K$_2$TaF$_7$) obtained by the present method is not only pure but can be converted directly into hydrated ammonium tantalum oxide without prior dissolution in HF. Because the K$_2$TaF$_7$ is formed instantaneously from a highly supersaturated (supersaturated with respect to K$_2$TaF$_7$) solution, it has a higher specific surface area than K$_2$TaF$_7$ prepared by slow crystallization. The K$_2$TaF$_7$ prepared by the method of this invention had an average surface area of about 0.62 m$^2$/g whereas samples of commercially available K$_2$TaF$_7$ averaged 0.12±0.5 m2/g. Due to its higher surface area, the precipitated K$_2$TaF$_7$ can be directly converted into hydrated ammonium tantalum oxide using ammonium hydroxide. This is a significant improvement over existing technology which requires complete dissolution of K$_2$TaF$_7$ in HF before conversion to hydrated ammonium tantalum oxide by reacting with ammonium hydroxide.

The FIGURE illustrates the various pathways by which purified tantalum-containing compounds can be obtained after the tantalum pentoxide dissolution step. The center pathway is a preferred wet chemical process for economically producing pure electronic grade tantalum pentoxide. This method does not require the large volumes of organic solvents used in solvent extraction methods or the relatively expensive resin and equipment needed for ion exchange.

In this preferred method, KCl is used to precipitate K$_2$TaF$_7$ from the tantalum containing solution produced in the dissolution step. The K$_2$TaF$_7$ precipitate is separated from the liquid by filtration and washed with water. The wet precipitate is then suspended in water and, optionally, a chelating agent such as ethylenediaminetetraacetic acid (EDTA) is added to sequester transition metals such as iron and copper. After mixing, the K$_2$TaF$_7$ is directly converted into hydrated ammonium tantalum oxide, (NH$_4$)$_2$Ta$_2$O$_6$·H$_2$O, by hydrolyzing the suspension with 14.5–15M ammonium hydroxide which is added while continuously stirring the suspension. After 2–3 hours, the (NH$_4$)$_2$Ta$_2$O$_6$·H$_2$O precipitate is filtered, washed to neutral pH with water and dried at 110° C. The (NH$_4$)$_2$Ta$_2$O$_6$·H$_2$O can then be converted into tantalum pentoxide by calcining at between about 900° to about 1000° C.

Purified tantalum pentoxide was made by forming a mixture of 132 g of technical grade tantalum pentoxide, containing approximately 600 ppm of niobium and other transition metal impurities, and 45 g of potassium carbonate. The mixture was heated in an alumina crucible at 750° C. to 850° C. for 5 to 10 hours to form potassium tantalate which was washed with water and dried at 110° C. A slurry of 125 g of the potassium tantalate and 125 ml of concentrated sulfuric acid was formed in a 4 l plastic beaker to which 225 ml of concentrated HF was then added. An exothermic reaction occurred and all of the potassium tantalate was converted into potassium/hydrogen fluorotantalate. Water was added to make a total volume of 4 l. A potassium fluorotantalate precipitate was formed by adding 100 g of KCl to the solution. After the crystals of potassium fluorotantalate had settled, the supernate was removed by decanting, leaving about 1 l of slurry. One liter of water was added to the slurry and the $K_2TaF_7$ precipitate was separated by filtration, washed with 1.5 l of water and resuspended into 6 l of water. The suspension was shaken well and 1 g of EDTA was added. A white precipitate was then formed by adding 800 ml of 14.5–15M ammonium hydroxide while continuously stirring the suspension. The white precipitate was left in the mother liquor for 2 hours to 3 days. The precipitate was filtered, washed to neutral pH, and dried at 110° C. to obtain hydrated ammonium tantalum oxide. Purified tantalum pentoxide was obtained by calcining the hydrated ammonium tantalum pentoxide at between 900° C. to 1000° C. in a silica boat. Samples from each stage were characterized by x-ray diffraction (XRD), glow discharge mass spectrometry (GDMS), and infra-red (IR) spectroscopy methods.

The purity of the tantalum pentoxide produced by the preferred wet chemical method is shown in Tables 3 and 4. In Table 3, the purity of the technical grade tantalum pentoxide used as the raw material is compared with the purity of the resultant purified tantalum pentoxide for three separate batches. The purity of tantalum pentoxide prepared from two different technical grade tantalum pentoxide sources is given in Table 4.

TABLE 3

| Elements | Concentration, ppm | | | |
|---|---|---|---|---|
| | Standard Technical Grade $Ta_2O_5$ | Purified $Ta_2O_5$ Batch #1 | Purified $Ta_2O_5$ Batch #2 | Purified $Ta_2O_5$ Batch #3 |
| Bismuth | <1 | <1 | <1 | <1 |
| Chromium | 15 | <1 | 1 | <1 |
| Cobalt | <1 | <1 | <1 | <1 |
| Copper | 21 | 3 | 2 | 3 |
| Iron | 64 | 3 | 2 | 2 |
| Lead | 2 | <1 | <1 | <1 |
| Manganese | 2 | <1 | <1 | <1 |
| Nickel | 9 | <1 | <1 | <1 |
| Niobium | 250 | 10 | 9 | 9 |
| Thorium | <1 | <1 | <1 | <1 |
| Tin | 2 | <1 | <1 | <1 |
| Titanium | <1 | <1 | <1 | <1 |
| Tungsten | 140 | 9 | 7 | 5 |
| Vanadium | <1 | <1 | <1 | <1 |
| Zinc | 4 | <1 | <1 | <1 |
| Zirconium | <1 | <1 | <1 | <1 |

TABLE 4

| Element | Concentration, ppm | | | |
|---|---|---|---|---|
| | $Ta_2O_5$ (A) | Purified-$Ta_2O_5$ (A) | $Ta_2O_5$ (B) | Purified-$Ta_2O_5$ (B) |
| Titanium | 5 | 1 | 1 | <1 |
| Vanadium | <1 | <1 | <1 | <1 |
| Chromium | 88 | 10 | 33 | 2 |
| Manganese | 7 | <1 | 6 | <1 |
| Iron | 240 | 12 | 81 | 3 |
| Cobalt | <1 | <1 | 8 | <1 |
| Nickel | 60 | 6 | 18 | <1 |
| Copper | 18 | <1 | 2000 | 4 |
| Zinc | 13 | 1 | — | 4 |
| Arsenic | <1 | <1 | <1 | <1 |
| Zirconium | 2 | <1 | <1 | <1 |
| Niobium | 130 | 2 | 180 | 7 |
| Molybdenum | 3 | 1 | 3 | 2 |
| Tin | 37 | 1 | 1 | <1 |
| Tungsten | 4 | 4 | 8700 | 13 |
| Lead | 2 | <1 | <1 | <1 |
| Bismuth | <1 | <1 | <1 | <1 |
| Thorium | <1 | <1 | <1 | <1 |

Thus, a pure electronic grade tantalum pentoxide can be obtained without using solvent extraction or ion exchange purification methods.

While there has been shown and described what are at the present considered the preferred embodiments of the invention, it will be obvious to those skilled in the art that various changes and modifications may be made therein without departing from the scope of the invention as defined by the appended claims.

We claim:

1. A method for the dissolution and purification of tantalum pentoxide comprising reacting tantalum pentoxide and a potassium-containing compound to form potassium tantalate, dissolving the potassium tantalate in a hydrofluoric acid medium to form a solution containing tantalum values and impurities and separating the tantalum values from the impurities.

2. The method of claim 1 wherein the potassium-containing compound is potassium carbonate.

3. The method of claim 2 wherein stoichiometric amounts of tantalum pentoxide and potassium carbonate are reacted at a temperature between about 550° C. to about 1300° C. for a time of about 3 hours to about 20 hours.

4. The method of claim 3 wherein the temperature is about 750° C. to about 850° C. and the time is about 5 hours to about 10 hours.

5. The method of claim 1 wherein the potassium tantalate is slurried with sulfuric acid before being dissolved in the hydrofluoric acid medium.

6. The method of claim 1 wherein the hydrofluoric acid medium is concentrated hydrofluoric acid.

7. The method of claim 1 wherein the tantalum values and the impurities are separated by ion exchange.

8. The method of claim 1 wherein the tantalum values and the impurities are separated by solvent extraction.

9. The method of claim 1 wherein the tantalum values are separated from the impurities by adding a water soluble potassium compound to the solution to form a $K_2TaF_7$ precipitate.

10. The method of claim 9 wherein the $K_2TaF_7$ precipitate is washed with dilute HF or water and dried to form capacitor grade $K_2TaF_7$.

11. The method of claim 9 further comprising suspending the $K_2TaF_7$ precipitate in an aqueous solution optionally containing a chelating agent, and adding ammonium hydroxide to form an ammonium tantalum oxide precipitate.

12. The method of claim 11 further comprising filtering, washing, drying and calcining the ammonium tantalum oxide precipitate at a temperature between about 900° C. to about 1000° C. to obtain a purified tantalum pentoxide.

13. The method of claim 9 wherein the water soluble potassium compound is selected from the group consisting of $K_2CO_3$, KOH, KF, KCl, $K_2C_2O_4$ and $K_2O$.

14. A method for the dissolution and purification of tantalum pentoxide comprising reacting stoichiometric amounts of an impure tantalum pentoxide and potassium carbonate to form potassium tantalate, optionally slurrying the potassium tantalate with sulfuric acid, dissolving the potassium tantalate in an hydrofluoric acid medium to form a solution containing tantalum values and impurities, precipitating potassium fluorotantalate by adding a water soluble potassium compound, filtering the solution to obtain a wet precipitate, suspending the wet precipitate in water, optionally adding an effective amount of a chelating agent, precipitating $(NH_4)_2Ta_2O_6 \cdot H_2O$ by adding ammonium hydroxide and calcining the $(NH_4)_2Ta_2O_6 \cdot H_2O$ to obtain a tantalum pentoxide having low amounts of niobium and transition metals.

15. The method of claim 14 wherein the water soluble potassium compound is KCl.

16. The method of claim 14 wherein the chelating agent is EDTA.

\* \* \* \* \*